United States Patent
Prakash et al.

(10) Patent No.: US 12,488,314 B2
(45) Date of Patent: Dec. 2, 2025

(54) SYSTEM AND METHOD FOR TRAILER UNLOAD PRIORITIZATION

(71) Applicant: Walmart Apollo, LLC, Bentonville, AR (US)

(72) Inventors: Abhijeet Prakash, Bihar (IN); Pavan Boppidi, Centerton, AR (US); Raju Chautagi, Karnataka (IN); Najla Jannah Williams, Cypress, TX (US); Bhukailas Reddy Bandlapalli, Andhra Pradesh (IN); Hariprasad Ramamoorthy, Bentonville, AR (US); Venkata Subramanian Madhu, Bangalore (IN); Susarla Chakravarthy Sitarama, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 299 days.

(21) Appl. No.: 18/347,039

(22) Filed: Jul. 5, 2023

(65) Prior Publication Data

US 2025/0013981 A1     Jan. 9, 2025

(51) Int. Cl.
*G06Q 10/087*     (2023.01)
*G06Q 10/0833*   (2023.01)

(52) U.S. Cl.
CPC ....... *G06Q 10/087* (2013.01); *G06Q 10/0833* (2013.01)

(58) Field of Classification Search
CPC .. G06Q 10/087; G06Q 10/0833; G06Q 10/08; G06Q 10/0838
See application file for complete search history.

(56) References Cited

U.S. PATENT DOCUMENTS

| | | |
|---|---|---|
| 10,885,490 B2 | 1/2021 | Mains, Jr. et al. |
| 11,443,396 B2 | 9/2022 | Morris |
| 11,640,580 B2 | 5/2023 | Rorro et al. |
| 2015/0046229 A1* | 2/2015 | Gollu ............ G06Q 10/06393 705/337 |
| 2019/0139174 A1* | 5/2019 | Ward ............ G06Q 10/06316 |
| 2020/0027051 A1* | 1/2020 | Burleson ............ B65G 69/28 |
| 2020/0273133 A1* | 8/2020 | Morris ............ G06Q 10/08 |
| 2022/0292455 A1* | 9/2022 | Rorro ............ G06Q 10/0833 |

FOREIGN PATENT DOCUMENTS

WO    2022006344 A1    1/2022

* cited by examiner

*Primary Examiner* — Garcia Ade
(74) *Attorney, Agent, or Firm* — Morgan, Lewis & Bockius LLP; Manita Rawat

(57) ABSTRACT

Systems and methods for prioritizing trailers for unloading freights of the trailers at a distribution center or fulfillment center are disclosed. A disclosed method includes: obtaining, for each of a plurality of trailers carrying freights and waiting at a product receiving center, at least one lever parameter; obtaining, from the database, a ranking model; generating a priority list of the plurality of trailers based on the at least one lever parameter and the ranking model; creating, based at least on the priority list, a notification corresponding to a top trailer ranked at the top of the priority list; and transmitting the notification to at least one mobile device for unloading the freight of the top trailer at the product receiving center.

15 Claims, 12 Drawing Sheets

410

| | 0-12 hrs | 12-24 hrs | 24-36 hrs | 36+ hrs | | | | | | | | | |
|---|---|---|---|---|---|---|---|---|---|---|---|---|---|
| | SSTK | ASM | GEN | DSDC | | IN | XI | CX | Other | DIST | SSTK | Other | |

| TUP | DC # | Delivery # | SCAC | Trailer # | Location | TCR | Status | MABD | Commodity | Total case | PO count |
|---|---|---|---|---|---|---|---|---|---|---|---|
| 1 | 6009 | 39175880 | HUMD | 119263 | 6009 - 300 | ◇ | IN | 02/16/2023 | DIST | 120 | 1 |
| 2 | 6009 | 39368730 | WM | 177919 | 6009 - 237 | ◇ | XI | 02/17/2023 | SSTK | 2048 | 19 |
| 3 | 6009 | 39381363 | WM | 163165 | E | ◇ | XI | 02/17/2023 | SSTK | 2992 | 6 |
| 4 | 6009 | 39369271 | WM | 164543 | 6009 - 189 | ◇ | IN | 02/17/2023 | DIST | 2413 | 17 |
| 5 | 6009 | 39269787 | JBR | 244414 | 6009 - 192 | ◇ | IN | 02/14/2023 | DIST | 1342 | 14 |
| 6 | 6009 | 39241358 | WM | 176949 | 6009 - 160 | ◇ | IN | 02/14/2023 | DIST | 875 | 2 |
| 7 | 6009 | 39244485 | WM | 164028 | D | ◇ | IN | 02/17/2023 | SSTK | 770 | 1 |
| 8 | 6009 | 39358805 | KHEP | 536846 | G | ◇ | IN | 02/15/2023 | DIST | 380 | 4 |

Delivery 39764377 - 48 POs | 3543 Total cases

| CBD | SSW | ASA |
|---|---|---|
| 1143 | 1450 | 950 |

| Item handling | Total qty | Allocated | % | Non-allocated | % | Prime |
|---|---|---|---|---|---|---|
| CP CONVEYABLE | 2934 | 1654 | 56% | 1280 | 44% | CDF |
| BP CONVEYABLE | 434 | 344 | 79% | 90 | 21% | XH |
| CP VOICE PICK | 19 | 0 | 0% | 19 | 100% | M |
| CP PLT PK NC | 175 | 111 | 63% | 64 | 37% | M |
| BP CONV PICKS | 49 | 49 | 100% | 0 | 0% | |
| CP NONCON RTS | 4 | 4 | 100% | 0 | 0% | |

| PO number | PO type | Load type | Cases | MABD | Events | Vendor name |
|---|---|---|---|---|---|---|
| 6922707907 | 20 | PLT | 1200 | 03/23 | WHSSTKWK 07 | ELEMENT TELEVISION C |
| 8624568439 | 33 | FLR | 7 | 03/23 | POS REPLEN | EXQUISITE APPAREL CO |

FIG. 4B

SYSTEM AND METHOD FOR TRAILER UNLOAD PRIORITIZATION

TECHNICAL FIELD

This application relates generally to trailer unloading and, more particularly, to systems and methods for prioritizing trailers for unloading freights of the trailers at a distribution center or fulfillment center.

BACKGROUND

Distribution centers, fulfillment centers, warehouses, and retail stores receive retail products for eventual customer purchase. The products typically arrive by delivery trailers or trucks from the manufacturer or from other distribution centers. In order to move the products in a freight of a trailer into a distribution center, the freight must be first unloaded from the trailer at an unloading dock or door of the distribution center.

While there are usually multiple trailers waiting to be unloaded at a yard of a distribution center, an existing yard management system schedules unloading of the multiple trailers merely based on their arrival time to the distribution center. For example, a distribution center manager may pull down a spreadsheet from a share point site to run a script, e.g. twice a day, to determine which trailer to unload next on a first-in first-out (FIFO) basis. This leads to missing important freight being unloaded based on the demand and does not allow for real time calculation of trailers' unload ranking prioritization.

SUMMARY

The embodiments described herein are directed to systems and methods for prioritizing trailers for unloading freights of the trailers at a product receiving center. A product receiving center may be a distribution center, a fulfillment center, a warehouse, a retail store, or any other place that can receive products via trailers.

In various embodiments, a system for a product receiving center is disclosed. The system comprises: a database comprising information related to a plurality of trailers carrying freight and waiting at a yard of the product receiving center; a plurality of mobile devices configured to receive notifications for unloading the freight of the plurality of trailers; and a computing device comprising at least one processor in communication with the database and the plurality of mobile devices. The computing device is configured to: obtain, for each of the plurality of trailers, a plurality of lever parameters; obtain, from the database, a ranking model; generate a priority list of the plurality of trailers based on the plurality of lever parameters and the ranking model; create, based at least on the priority list, a notification corresponding to a top trailer ranked at the top of the priority list; and transmit the notification to at least one of the plurality of mobile devices for unloading the freight of the top trailer.

In various embodiments, a disclosed method is implemented on a computing device having at least one processor in communication with a database. The method includes: obtaining, for each of a plurality of trailers carrying freights and waiting at a product receiving center, at least one lever parameter; obtaining, from the database, a ranking model; generating a priority list of the plurality of trailers based on the at least one lever parameter and the ranking model; creating, based at least on the priority list, a notification corresponding to a top trailer ranked at the top of the priority list; and transmitting the notification to at least one mobile device for unloading the freight of the top trailer at the product receiving center.

In various embodiments, a non-transitory computer readable medium having instructions stored thereon is disclosed. The instructions, when executed by at least one processor, cause at least one device to perform operations comprising: obtaining, for each of a plurality of trailers carrying freights and waiting at a product receiving center, at least one lever parameter; obtaining, from the database, a ranking model; generating a priority list of the plurality of trailers based on the at least one lever parameter and the ranking model; creating, based at least on the priority list, a notification corresponding to a top trailer ranked at the top of the priority list; and transmitting the notification to at least one mobile device for unloading the freight of the top trailer at the product receiving center.

In some embodiments, a disclosed system is a trailer unload prioritization (TUP) system that connects with supply chain systems such as inventory, replenishment, order management system, scheduler, yard management system, item inventory, etc.; and calculate scores for each trailer based on levers it is qualifying, which leads to real-time trailer unloading priority in a yard of a distribution center or fulfilment center. The TUP can generate a snapshot of trailers ranking, to help unloading prioritization and analyze level of service for the trailers in real-time.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein:

FIGS. 4A-4B illustrate exemplary user interfaces for trailer unload prioritization, in accordance with some embodiments of the present teaching.

DETAILED DESCRIPTION

Figure 1:
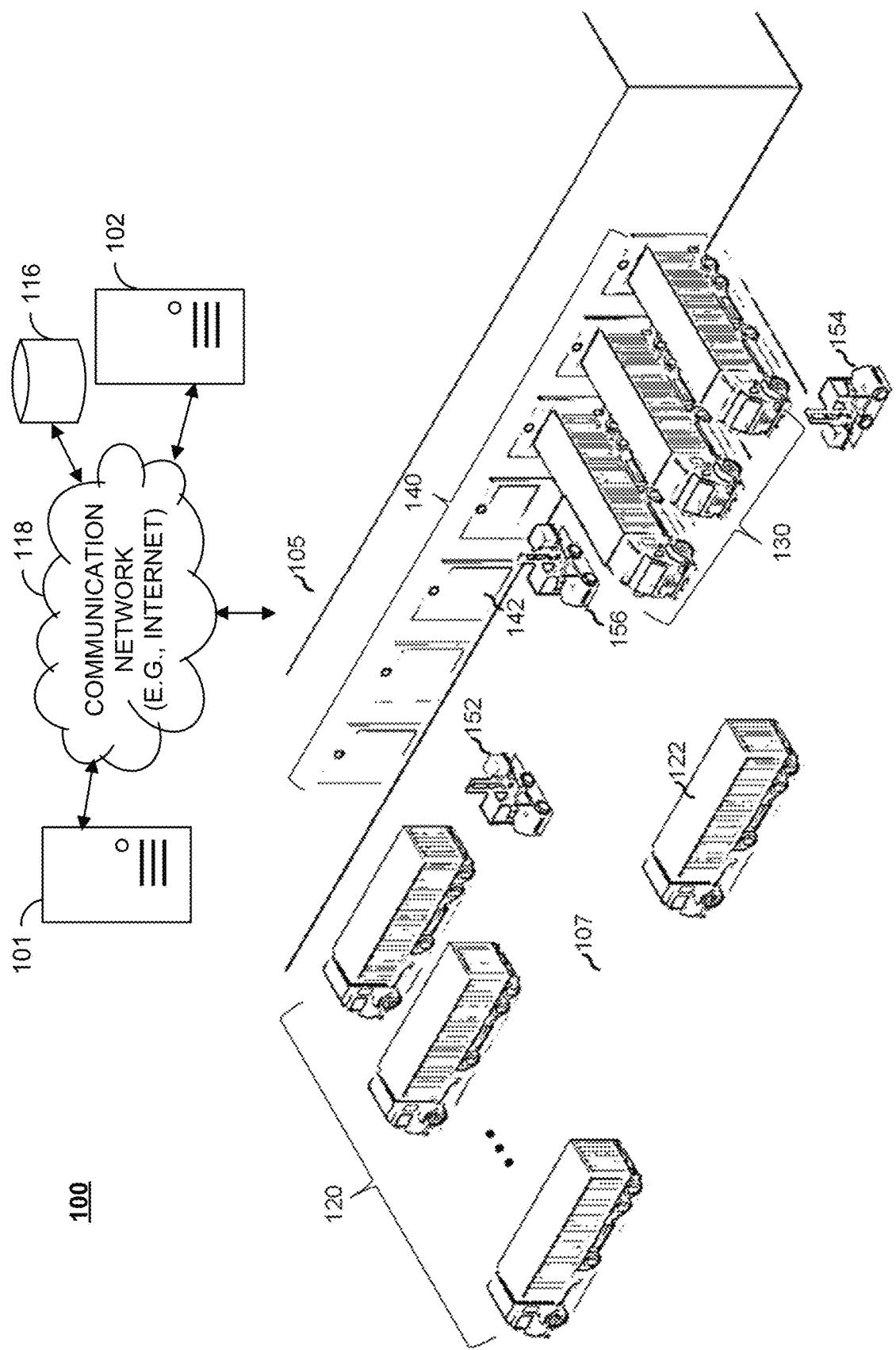
FIG. 1 is a network environment configured for trailer unload prioritization, in accordance with some embodiments of the present teaching.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

Modern commerce relies on the use of trailers, trucks and/or other vehicles to deliver their freight or cargo to distribution centers, fulfillment centers, warehouses, or other store locations having one or more loading docks or door where the trailers' freight can be loaded or unloaded. How to prioritize trailers' unloading is an essential aspect of logistics and supply chain management, as it directly impacts the speed and efficiency of the transportation of goods.

One goal of various embodiments in the present teaching is to provide a trailer unload prioritization (TUP) system utilized by a distribution center or fulfillment center to determine how to prioritize unloading of multiple drop trailers at the yard. The TUP system can rank trailers for unloading based on multiple factors like demand, inventory, annual events, must arrive by date (MABD), carrier, trailer status, origin, etc. For example, purchase orders that have the highest demand in stores are assigned a high priority ranking, given other lever factors.

In some embodiments, TUP can be enabled in a yard management system (YMS) to remove dependencies on legacy spreadsheet based tools. This can improve a YMS by removal of decommissioned tools and data flows that may result in downtime, error prone ranking and maintenance issues. In various embodiments, the configurations and dynamic lever parameters can be adjusted or added via a user interface of the YMS, manually or automatically based on a machine learning model. By evaluation of distribution centers based on how well they complete unloading according to TUP, a disclosed TUP system can provide efficient and effective trailer unload priority resulting in significant benefits for businesses, such as reducing transportation costs, improving delivery times, increasing customer satisfaction, and minimizing waste and spoilage.

In some embodiments, a disclosed TUP system can facilitate real time ranking of trailers leading to unload prioritization with a prioritization refresh rate improved from couple of times a day to about every 15 minutes, and a real time inbound trailer visibility accounting for every unload including non-ranked trailers. In addition, the TUP system may utilize a time series forecasting algorithm to adjust the parameters based on historical data of parameters from previous years. With adjustable ranking factors and lever parameters, the TUP system provides dynamic rankings applied on arrived trailers, based on real time item and inventory data.

Furthermore, in the following, various embodiments are described with respect to methods and systems for prioritizing trailers for unloading freights of the trailers at a distribution center or fulfillment center are disclosed. A disclosed method includes: obtaining, for each of a plurality of trailers carrying freights and waiting at a product receiving center, at least one lever parameter; obtaining, from the database, a ranking model; generating a priority list of the plurality of trailers based on the at least one lever parameter and the ranking model; creating, based at least on the priority list, a notification corresponding to a top trailer ranked at the top of the priority list; and transmitting the notification to at least one mobile device for unloading the freight of the top trailer at the product receiving center.

For simplicity, the following descriptions will focus on methods and systems for trailer unloading and management at a distribution center, while the same methods and systems can be applied to trailer unloading and management at fulfillment centers, warehouses, retail stores, or any other types of product receiving centers, without going beyond the scope of the present teaching.

Turning to the drawings, FIG. 1 is a network environment 100 configured for trailer unload prioritization, in accordance with some embodiments of the present teaching. The network environment 100 includes a plurality of devices or systems configured to communicate over one or more network channels, illustrated as a network cloud 118. For example, in various embodiments, the network environment 100 can include, but not limited to, a yard management system 101, a trailer unload prioritization engine 102, a database 116, and a distribution center 105 operatively coupled over the network 118. The yard management system 101, the trailer unload prioritization engine 102, and any device in the distribution center 105 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each of the devices or systems in the network environment 100 can transmit and receive data over the communication network 118.

In some embodiments, the distribution center 105 has a plurality of loading docks 140. Although a distribution center 105 is described here, warehouses, other storage facilities or buildings for receiving freight or goods from a delivery trailer may equally apply. The loading docks 140, which may include bays, stations, doors, terminals, and so on, provide a location where goods, cargo, or freight can be loaded onto or unloaded from a trailer 120, 122, 130. Each trailer may be part of, hitched to, or otherwise attached to a powered vehicle such as a car, tractor, truck, cart, train, and so on. In some embodiments, a trailer may be driven, towed or otherwise moved to an assigned loading dock 140 by a driver using a powered vehicle. In some embodiments, the trailer may be pushed, towed, otherwise moved to the assigned loading dock 140 by a yard vehicle 152, 154, 156 that is different from the vehicle delivering the trailer to the yard 107. For example, the yard vehicles 152, 154, 156 may include but not be limited to autonomous, partially autonomous, self-driving, driverless, or driver-assisted carts or related ground vehicles. A yard vehicle may be controlled by the trailer unload prioritization engine 102, which can output control signals or the like that are received, processed, and executed by the yard vehicle. The yard vehicle in response can perform a function according to the received control signal(s).

A yard 107 or parking lot or other location at where a plurality of trailers 120 are queued can accommodate some or all vehicles and associated trailers waiting for access to an available loading dock 140. The yard 107 may be monitored by the trailer unload prioritization engine 102, e.g. via electronic sensors such as RFID readers. In some embodiments, the trailer unload prioritization engine 102 automatically outputs a data signal via the network 118 or directly to the trailer unload prioritization engine 102 for identification of a new trailer 122 entering the yard 107, and/or a request for unload prioritization of all trailers 120, 122 waiting in the yard 107.

A function of the trailer unload prioritization engine 102 is to determine a priority list of all trailers waiting to be unloaded in the yard 107. The higher ranked in the priority list a trailer is, the earlier the trailer is to be unloaded compared to other trailers. The priority list may be generated in response to a request from the trailer unload prioritization engine 102, or based on a pre-scheduled job. In some embodiments, the trailer unload prioritization engine 102 can obtain, for each of N trailers carrying freights and waiting at the yard 107, a plurality of lever parameters, with N being a positive integer larger than one. The trailer unload prioritization engine 102 may obtain a ranking model associated with the plurality of lever parameters from the database 116. In some embodiments, the database 116 comprises various information related to trailers in the yard 107, including but not limited to: item-on-hand data indicating a quantity of an item carried by a trailer and currently in stock for distribution at the distribution center; outbound need data indicating an outbound need for goods in the freight of a trailer in one or more future time periods; must-arrive-by-date (MABD) data indicating a quantity of days past a predetermined time by which a shipment of goods via a trailer must arrive at the distribution center; time-on-yard data indicating a time period spent by a trailer in the yard before being unloaded; first event data indicating a periodic event associated with a purchase order and a trailer; second event data indicating a non-periodic event associated with a purchase order and a trailer; carrier data indicating a carrier responsible for delivering goods via a trailer to the distribution center; trailer status data indicating a current status of each trailer; and origin data indicating an origin type of goods carried by a trailer based on their origin.

Based on the plurality of lever parameters and the ranking model, the trailer unload prioritization engine 102 can generate the priority list of the N trailers for unloading. Based on the priority list, the trailer unload prioritization engine 102 or the trailer unload prioritization engine 102 can manage the utilization of the loading docks 140 by the trailers. For example, the trailer unload prioritization engine 102 may create, based at least on the priority list, K notifications corresponding respectively to K trailers ranked at the top of the priority list, with K being a positive integer not larger than N. K can be one in some examples. In some embodiments, the trailer unload prioritization engine 102 or the trailer unload prioritization engine 102 can transmit the K notifications respectively to K mobile devices, for unloading the freights of the K trailers at the distribution center 105.

In various embodiments, each of the K mobile devices may be: a vehicle computer coupled to a respective yard vehicle 152, 153, 156; a personal computing device such as a smartphone, and/or other portable electronic devices of a driver responsible to drive a corresponding one of the K trailers to a target door of the distribution center 105 for unloading; or a computing device capable of identifying and controlling access to an available loading dock 140 for a particular trailer. For example, the trailer unload prioritization engine 102 or the trailer unload prioritization engine 102 can control a yard vehicle 154 to remove one trailer from the dock door and retrieve another trailer according to its ranking in the priority list.

In some embodiments, the trailer unload prioritization engine 102 or the trailer unload prioritization engine 102 may generate and output a signal to activate or inactivate various apparatuses such as fences, lights, gates, doors, and so on in response to the trailer unload prioritization engine 102 establishing a match between a selected trailer and a selected loading dock. For example, the trailer unload prioritization engine 102 can output via the network 118 a command to a controller that in response automatically opens a door to an interior of the distribution center 105 at loading dock 142 when the loading dock 142 is selected for unloading the freight of the trailer 122.

In some embodiments, the trailer unload prioritization engine 102 can periodically update the priority list, to indicate unload priority for all trailers waiting to be unloaded in the yard 107. For each update, trailers already being unloaded are not included, while any newly inbound trailer will be added for the updated priority list. In the example shown in FIG. 1, since trailers 130 are already being unloaded, they are not included in the updated priority list, which may indicate unloading priorities for the remaining trailers 120, 122 that are waiting to be unloaded in the yard. In one example, the trailer 122 is ranked at the top of the updated priority list, although the trailer 122 arrived at the yard 107 later than other trailers 120. Then, the trailer unload prioritization engine 102 or the trailer unload prioritization engine 102 may determine that the loading dock 142 is available, and send a control signal or notification to a smartphone of a driver or a computer on a yard vehicle 152, to instruct unloading of the trailer 122 at the loading dock 142. In one example, after receiving a corresponding notification, the smartphone indicates that the driver is responsible to drive the trailer 122 to a target door of the loading dock 142 for unloading the trailer 122. In another example, after receiving a corresponding notification, the yard vehicle 152 automatically navigates to the trailer 122 to facilitate mechanical coupling of the yard vehicle 152 and the trailer 122, and transports the trailer 122 to a target door of the loading dock 142 for unloading the trailer 122.

In some examples, each of the yard management system 101, the trailer unload prioritization engine 102, and any device described above regarding the distribution center 105 can be a computer, a workstation, a laptop, a server such as a cloud-based server, or any other suitable device. In some examples, the trailer unload prioritization engine 102 is a server that includes one or more processing units, such as one or more graphical processing units (GPUs), one or more central processing units (CPUs), and/or one or more processing cores. The trailer unload prioritization engine 102 may, in some examples, execute one or more virtual machines. In some examples, processing resources (e.g., capabilities) of the trailer unload prioritization engine 102 are offered as a cloud-based service (e.g., cloud computing).

In some examples, the yard management system 101, the trailer unload prioritization engine 102, and/or the distribution center 105 are operated by a retailer. In some examples, the yard management system 101, and/or the trailer unload prioritization engine 102 are operated by a third party (e.g., a cloud-computing provider) other than the retailer.

Although FIG. 1 illustrates one distribution center 105, the network environment 100 can include any number of distribution centers 105 operating in accordance with the instructions from the trailer unload prioritization engine 102 and the trailer unload prioritization engine 102. Similarly, the network environment 100 can include any number of the yard management systems 101, the trailer unload prioritization engines 102, the databases 116, the trailers 120, 122, 130, the loading docks 140, and the yard vehicles 152, 154, 156.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 118 can provide access to, for example, the Internet.

The yard management system 101 and/or the trailer unload prioritization engine 102 may be operable to communicate with the database 116 over the communication network 118. For example, the yard management system 101 can store data to, and read data from, the database 116. The database 116 can be a remote storage device, such as a cloud-based server, a disk (e.g., a hard disk), a memory device on another application server, a networked computer, or any other suitable remote storage. Although shown remote to the yard management system 101, in some examples, the database 116 can be a local storage device, such as a hard drive, a non-volatile memory, or a USB stick. In some examples, the yard management system 101 may store data related to the yard 107 into the database 116. In some examples, the trailer unload prioritization engine 102 may retrieve data related to the trailers in the yard 107 from the database 116, and store the generated or updated priority list into the database 116.

In some examples, the trailer unload prioritization engine 102 may execute one or more models (e.g., algorithms), such as a machine learning model, deep learning model, statistical model, etc., to provide a trailer unload priority list. In some examples, the trailer unload prioritization engine 102 generates training data for a plurality of models (e.g., machine learning models, deep learning models, statistical models, algorithms, etc.) based on historical unloading data, e.g. event data, MABD data, outbound need data, unload priority data, etc. The trailer unload prioritization engine 102 trains the models based on their corresponding training data, and stores the models in a database, such as in the database 116 (e.g., a cloud storage). The models, when executed by the trailer unload prioritization engine 102, allow the trailer unload prioritization engine 102 to generate or update a priority list for trailers waiting in the yard 107 to be unloaded.

In some examples, the trailer unload prioritization engine 102 assigns the models (or parts thereof) for execution to one or more cloud devices (not shown) coupled to the network 118. For example, each model may be assigned to a virtual machine hosted by a cloud device. The virtual machine may cause the models or parts thereof to execute on one or more processing units such as GPUs. In some examples, the virtual machines assign each model (or part thereof) among a plurality of processing units. Based on the output of the models, the trailer unload prioritization engine 102 may provide a corresponding service response to the yard management system 101.

Figure 2:
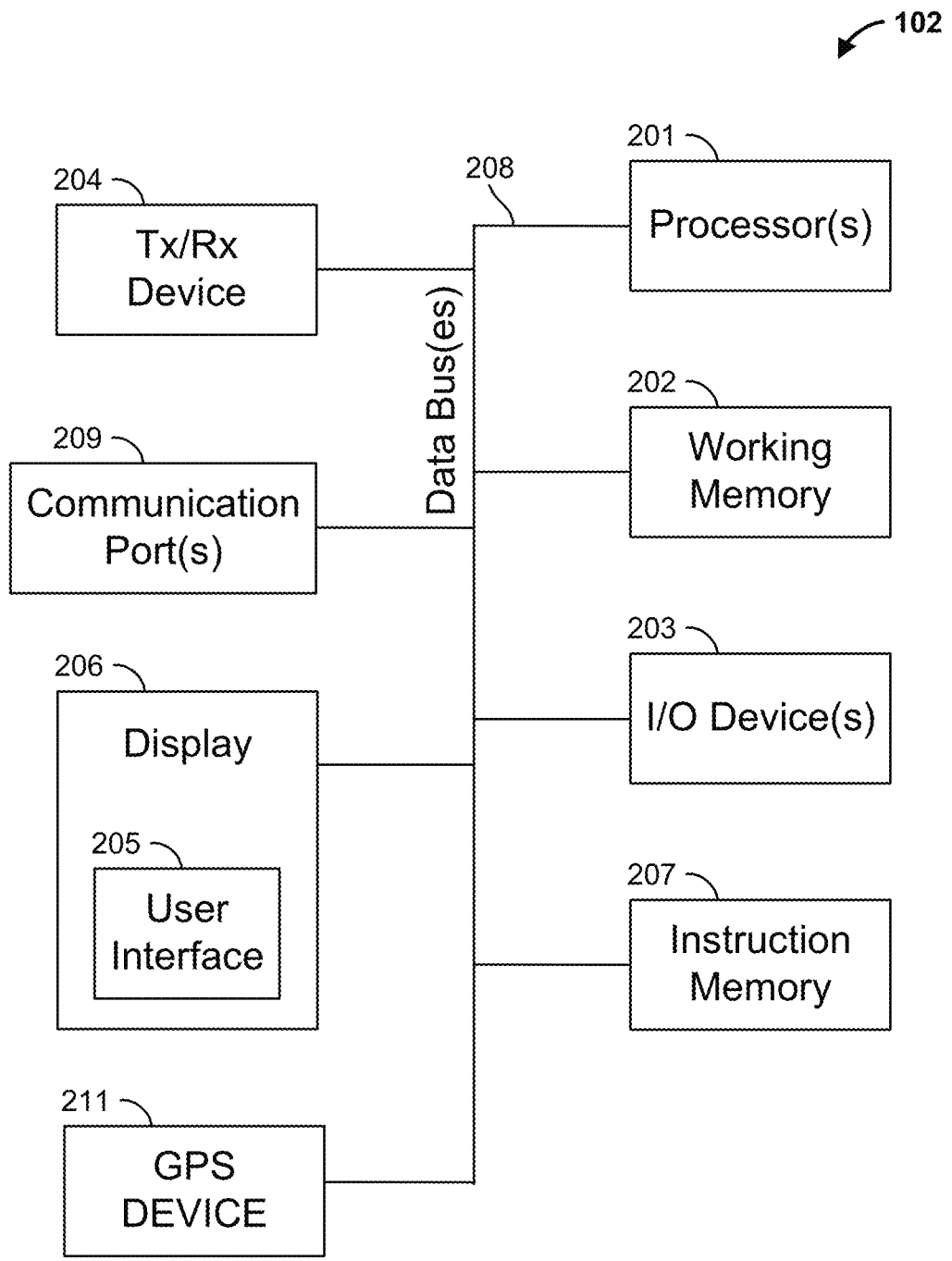
FIG. 2 is a block diagram of a trailer unload prioritization engine, in accordance with some embodiments of the present teaching.

FIG. 2 illustrates a block diagram of a trailer unload prioritization engine, e.g. the trailer unload prioritization engine 102 of FIG. 1, in accordance with some embodiments of the present teaching. In some embodiments, each of the yard management system 101, the trailer unload prioritization engine 102, and the devices in the distribution center 105 in FIG. 1 may include the features shown in FIG. 2. Although FIG. 2 is described with respect to the trailer unload prioritization engine 102, it should be appreciated, however, that the elements described can be included, as applicable, in any of the yard management system 101, the trailer unload prioritization engine 102, and the devices in the distribution center 105.

As shown in FIG. 2, the trailer unload prioritization engine 102 can include one or more processors 201, a working memory 202, one or more input/output devices 203, an instruction memory 207, a transceiver 204, one or more communication ports 209, a display 206 with a user interface 205, and an optional global positioning system (GPS) device 211, all operatively coupled to one or more data buses 208. The data buses 208 allow for communication among the various devices. The data buses 208 can include wired, or wireless, communication channels.

The processors 201 can include one or more distinct processors, each having one or more cores. Each of the distinct processors can have the same or different structure. The processors 201 can include one or more central processing units (CPUs), one or more graphics processing units (GPUs), application specific integrated circuits (ASICs), digital signal processors (DSPs), and the like.

The instruction memory 207 can store instructions that can be accessed (e.g., read) and executed by the processors 201. For example, the instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. The processors 201 can be configured to perform a certain function or operation by executing code, stored on the instruction memory 207, embodying the function or operation. For example, the processors 201 can be configured to execute code stored in the instruction memory 207 to perform one or more of any function, method, or operation disclosed herein.

Additionally, the processors 201 can store data to, and read data from, the working memory 202. For example, the processors 201 can store a working set of instructions to the working memory 202, such as instructions loaded from the instruction memory 207. The processors 201 can also use the working memory 202 to store dynamic data created during the operation of the trailer unload prioritization engine 102.

The working memory 202 can be a random access memory (RAM) such as a static random access memory (SRAM) or dynamic random access memory (DRAM), or any other suitable memory.

The input-output devices 203 can include any suitable device that allows for data input or output. For example, the input-output devices 203 can include one or more of a keyboard, a touchpad, a mouse, a stylus, a touchscreen, a physical button, a speaker, a microphone, or any other suitable input or output device.

The communication port(s) 209 can include, for example, a serial port such as a universal asynchronous receiver/transmitter (UART) connection, a Universal Serial Bus (USB) connection, or any other suitable communication port or connection. In some examples, the communication port(s) 209 allows for the programming of executable instructions in the instruction memory 207. In some examples, the communication port(s) 209 allow for the transfer (e.g., uploading or downloading) of data, such as machine learning model training data.

The display 206 can be any suitable display, and may display the user interface 205. The user interfaces 205 can enable user interaction with the trailer unload prioritization engine 102. For example, the user interface 205 can be a user interface for an application of a retailer that allows a customer to view and interact with a retailer's website. In some examples, a user can interact with the user interface 205 by engaging the input-output devices 203. In some examples, the display 206 can be a touchscreen, where the user interface 205 is displayed on the touchscreen.

The transceiver 204 allows for communication with a network, such as the communication network 118 of FIG. 1. For example, if the communication network 118 of FIG. 1 is a cellular network, the transceiver 204 is configured to allow communications with the cellular network. In some examples, the transceiver 204 is selected based on the type of the communication network 118 the trailer unload prioritization engine 102 will be operating in. The processor(s) 201 is operable to receive data from, or send data to, a network, such as the communication network 118 of FIG. 1, via the transceiver 204.

The optional GPS device 211 may be communicatively coupled to the GPS and operable to receive position data from the GPS. For example, the GPS device 211 may receive position data identifying a latitude, and longitude, from a satellite of the GPS. Based on the position data, the trailer unload prioritization engine 102 may determine a local geographical area (e.g., town, city, state, etc.) of its position. Based on the geographical area, the trailer unload prioritization engine 102 may determine relevant trend data (e.g., trend data identifying events in the geographical area).

Figure 3:
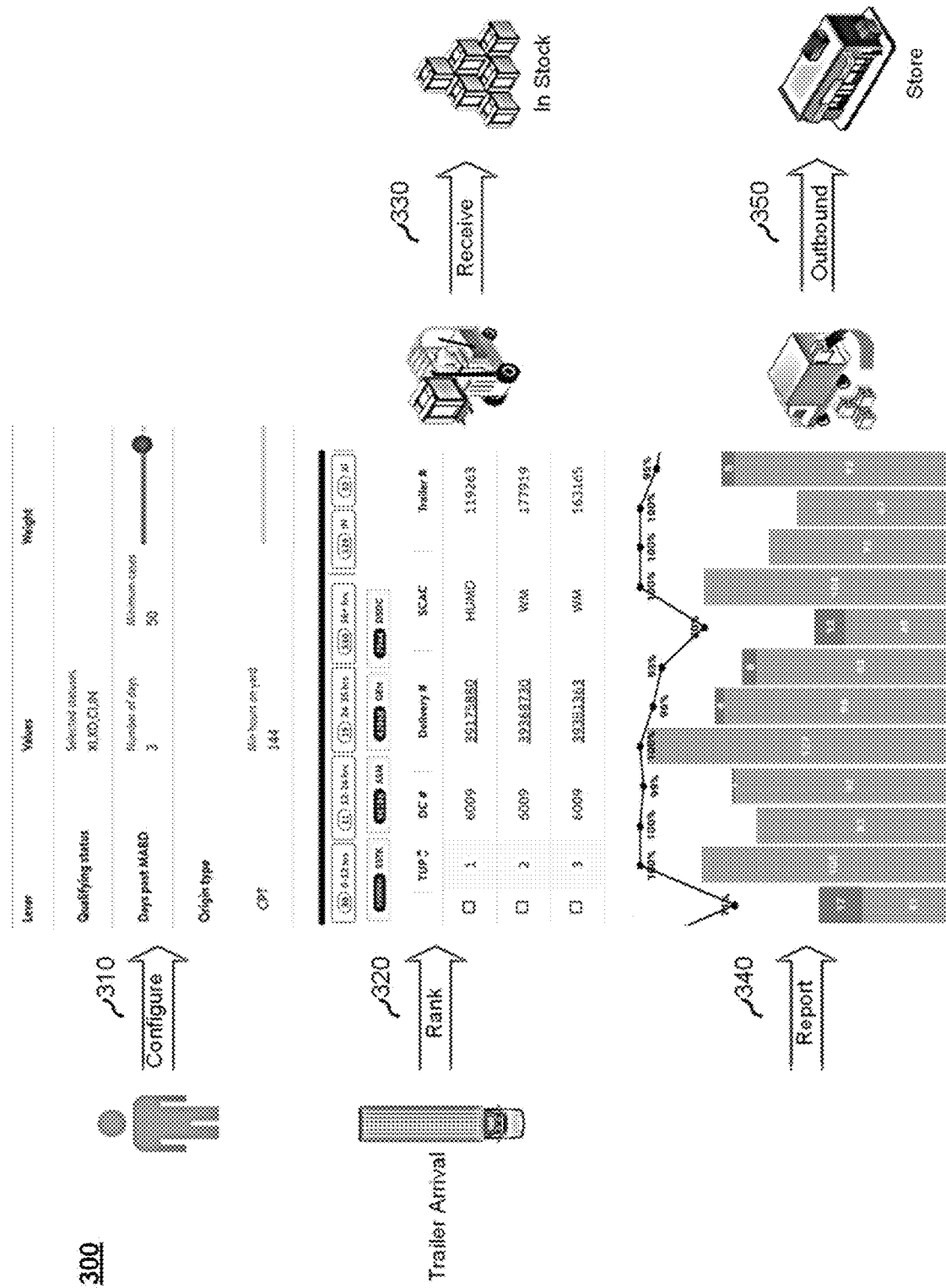
FIG. 3 illustrates an exemplary flow for trailer unload prioritization, in accordance with some embodiments of the present teaching.

FIG. 3 illustrates an exemplary flow 300 for trailer unload prioritization, in accordance with some embodiments of the present teaching. As indicated in FIG. 3, the flow 300 starts from an operation 310, where a distribution center manager configures model and parameters of a TUP system, via a first user interface. In some embodiments, the TUP system may be configured based on a machine learning model trained based on historical data.

After trailer arrival at a yard of a distribution center, the TUP system can help ranking the trailers to determine their priorities of unloading, at operation 320, to provide a priority list via a second user interface. Then, the TUP system or a yard management system can create a move signal, and send the move signal to a yard vehicle or a smartphone of a driver. Based on the move signal, the freight carried by a trailer ranked at the top of the priority list is received by the distribution center and stored in the inventory, at operation 330.

At operation 340, the TUP system or the yard management system can provide reports, via one or more user interfaces, to indicate trailer unloading information and inventory information during a past time period. Based on these reports, a loading process onto trailers may be performed at operation 350 to transport some products from the distribution center to one or more stores for retail.

FIGS. 4A-4B illustrate exemplary user interfaces for trailer unload prioritization, in accordance with some embodiments of the present teaching. As shown in FIG. 4A, a user interface 410 includes a TUP list 412 indicating an ordered list of trailers whose corresponding trailer ID numbers 414 are shown as well. In the example shown in FIG. 4A, for trailers waiting in the yard of the distribution center with DC #6009, trailer #119263 is ranked the first in the priority list. This means the TUP system recommends that when a loading dock or door becomes available at the distribution center #6009, trailer #119263 should be first unloaded before the remaining trailers in the priority list. In addition, the user interface 410 also shows other information related to each trailer, e.g. delivery #, carrier code, location, status, MABD, commodity code, total case quantity, total counts of purchase orders, etc.

In some embodiments, once a user clicks on one item in the list of the user interface 410, e.g. by clicking on a delivery #, the user is automatically directed to a user interface 420 including detailed information of the delivery # as shown in FIG. 4B. In the example shown in FIG. 4B, the user interface 420 includes real time trailer load information corresponding to delivery #39764377 corresponding to a trailer, which includes 48 purchase orders and 3543 total cases. The user interface 420 shows different purchase order types, load types, total cases, event information, etc. for each purchase order in the trailer, upon user scrolling up and down of the screen. In some embodiments, at least some of the information listed in the user interfaces 410, 420 may be utilized by a TUP system to generate or update a priority list for unloading trailers.

Figure 5:
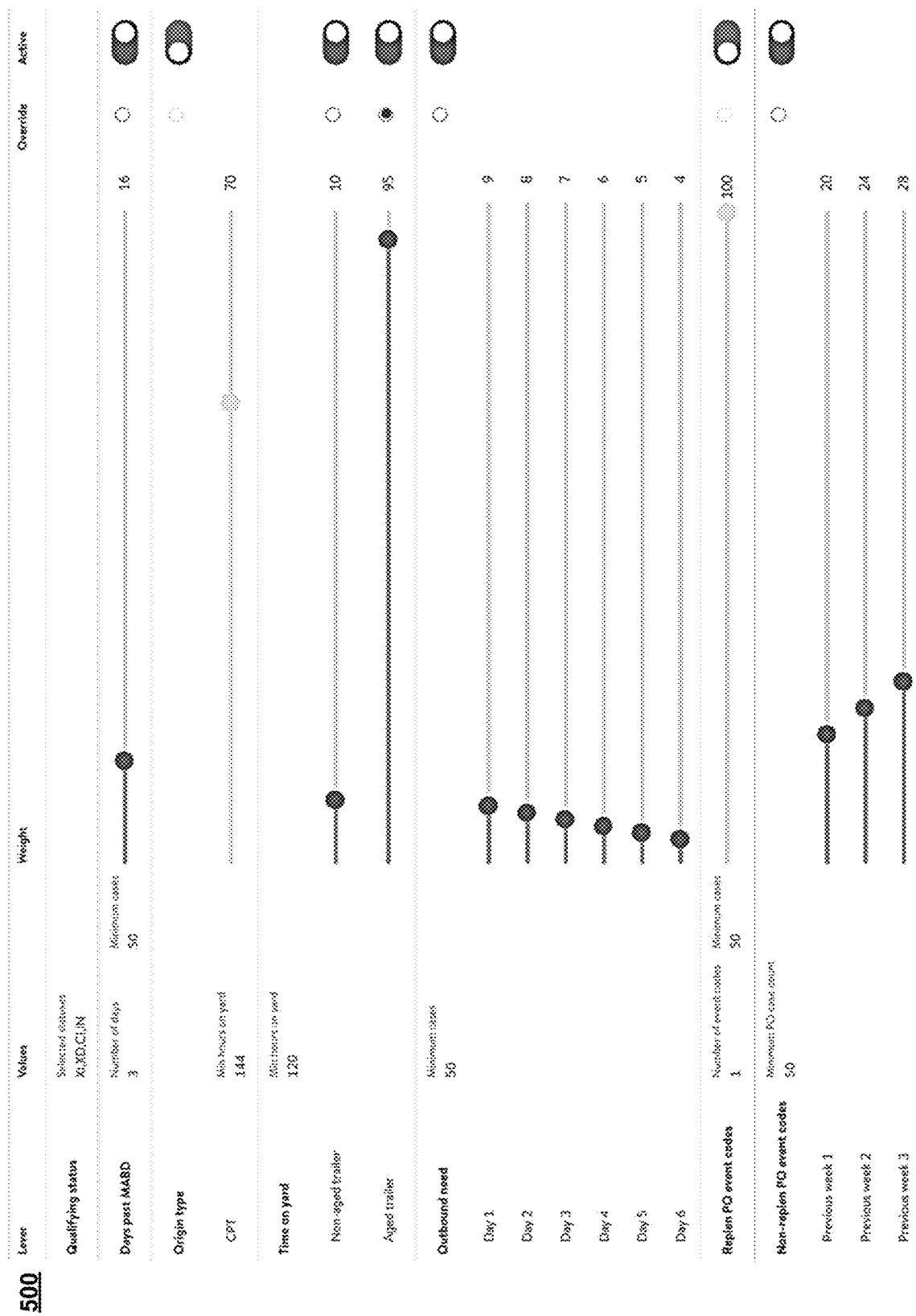
FIG. 5 illustrates exemplary lever parameters configured for trailer unload prioritization, in accordance with some embodiments of the present teaching.

FIG. 5 illustrates a user interface 500 showing exemplary lever parameters configured for trailer unload prioritization, in accordance with some embodiments of the present teaching. As shown in FIG. 5, the user interface 500 includes lever parameters like: qualifying status, days past MABD, origin type, time on yard, outbound need, replenishment purchase order (PO) event codes, non-replenishment PO event codes. In some embodiments, a TUP system or engine may determine these lever parameters for each trailer waiting to be unloaded in a yard of a same distribution center or fulfillment center, and generate a priority list based on a weighted combination of these parameters.

In some embodiments, a qualifying status indicates a current status of a trailer, e.g. whether the trailer is empty, whether the trailer is an inbound trailer or a cross-talk trailer. Days past MABD indicate how many days has a trailer passed its MABD, which is used in logistics and supply chain management to refer to the date and time by which a shipment of goods must arrive at its destination. Origin type of a trailer refers to the classification of goods of the trailer based on their source or origin. For example, goods could be classified as originating from a particular supplier, manufacturer, or location. Time on yard indicates time spent by a trailer in the yard before the trailer is unloaded. Outbound need in a distribution center refers to the quantity of goods that need or demanded to be shipped or transported out of the distribution center to fulfill customer orders or meet other demands, within each day of a future time period. In some embodiments, the outbound needs can vary depending on various factors such as customer demand, seasonality, and production schedules. The replenishment PO event codes in FIG. 5 are codes referring to different events associated with a purchase order and/or a trailer for back filling an inventory, e.g. Easter, back to school season, etc. The non-replenishment PO event codes in FIG. 5 are codes referring to pre-defined periodic times associated with a purchase order and/or a trailer, e.g. happened in each week.

In some embodiments, the TUP system or engine may also determine other lever parameters for each trailer waiting to be unloaded, e.g. urgency of the goods being delivered, a quantity of an item carried by a trailer and currently in stock for distribution at the distribution center, a carrier responsible for delivering goods via a trailer to the distribution center, etc.

As shown in FIG. 5, a lever parameter may be activated or deactivated, based on manual or automatic configuration. In the example shown in FIG. 5, the replenishment PO event codes are inactive, while the non-replenishment PO event codes are active. In addition, each active lever parameter may be assigned a weight when being used to determine a priority for a trailer. For example, a weight 16 out of 100 is assigned to the lever parameter "days past MABD;" and a weight 9 out of 100 is assigned to the outbound need in day 1 (i.e. the next day). A larger weight indicates a higher importance or contribution to the unloading priority for a corresponding lever parameter. For example, the outbound need in a near future day has a higher weight than the outbound need in a farther future day, as the outbound need in the near future day is more critical and contributes more to unloading priority of a trailer compared to that in the farther future day. In some embodiments, a lever parameter may be pre-configured with a default weight, which can be used to override a customized weight when the override function is activated.

In some embodiments, a lever parameter may be associated with some values to help defining or determining the lever parameter. For example, a threshold value of 120 hours on yard may be applied to the time on yard of a trailer, to determine whether the trailer is a non-aged trailer (having a time on yard less than 120 hours) or an aged trailer (having a time on yard larger than or equal to 120 hours). As shown in FIG. 5, while a weight 10 is assigned to a non-aged trailer, a weight 95 is assigned to an aged trailer.

In some embodiments, a pre-configured qualifying score is assigned to each trailer when the trailer qualifies for a corresponding lever parameter. For example, when a trailer carries at least 50 cases and has been at least 3 days past its MABD, it may be assigned a qualifying score, e.g. 50. Then, a priority score may be computed for each trailer based on a weighted summation or another weighted combination of the qualifying scores for the lever parameters measured or determined for this trailer. The system can generate a priority list of the trailers waiting to be unloaded based on their respective priority scores, where a higher priority score corresponds to a higher rank in the priority list.

In some embodiments, a TUP system may use additional lever parameters to generate the priority list, based on the market type and/or business needs. In addition, the lever parameters, the qualifying scores, the parameter weights, and/or the combination methods can be adjusted according to different market types and business needs. In some embodiments, the TUP system may determine a new event for triggering trailer unload prioritization, e.g. an event added by a user input, or based on a business decision like a big sale week. The TUP system may then automatically pull historical data related to the event, re-train the machine learning model based on the pulled historical data, and update the lever parameters, the qualifying scores, the parameter weights, and/or the combination methods for generating trailer unload priority lists.

Figure 6:
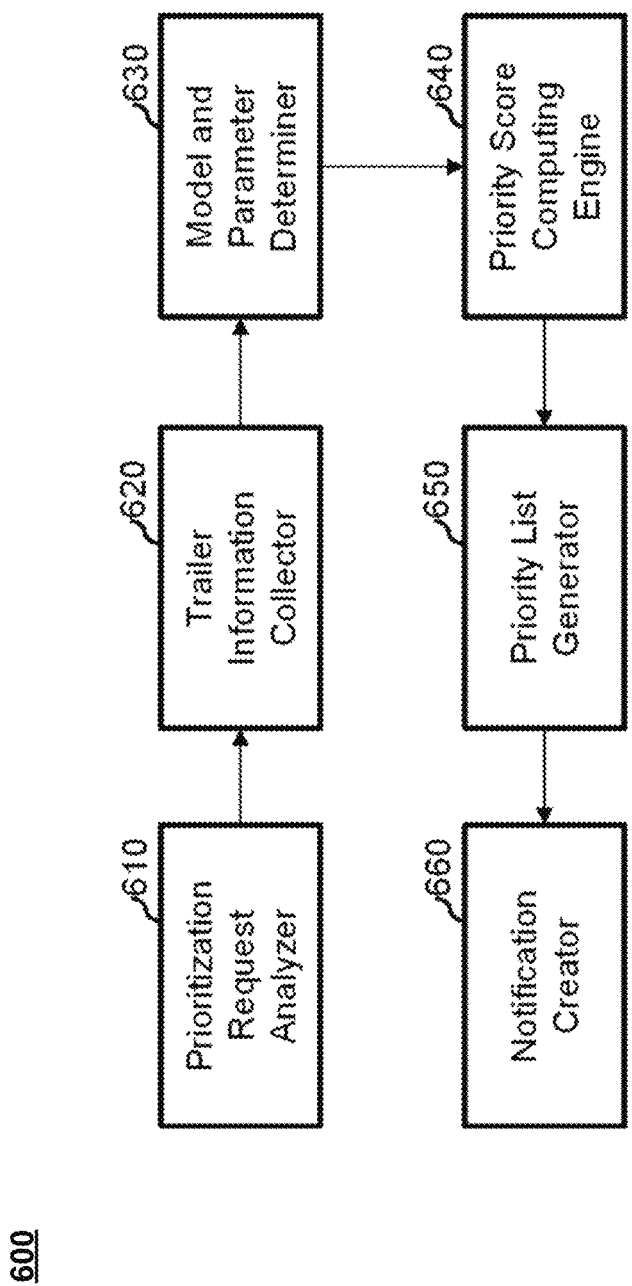
FIG. 6 illustrates an exemplary block diagram illustrating a more detailed view of a trailer unload prioritization engine, in accordance with some embodiments of the present teaching.

FIG. 6 illustrates an exemplary block diagram illustrating a more detailed view of a trailer unload prioritization engine 600, in accordance with some embodiments of the present teaching. In some embodiments, the trailer unload prioritization engine 600 may be implemented as the trailer unload prioritization engine 102 in FIG. 1 and FIG. 2. As shown in FIG. 6, the trailer unload prioritization engine 600 includes a prioritization request analyzer 610, a trailer information collector 620, a model and parameter determiner 630, a priority score computing engine 640, a priority list generator 650, and a notification creator 660.

In some examples, one or more of the prioritization request analyzer 610, the trailer information collector 620, the model and parameter determiner 630, the priority score computing engine 640, the priority list generator 650, and the notification creator 660 are implemented in hardware. In some examples, one or more of the prioritization request analyzer 610, the trailer information collector 620, the model and parameter determiner 630, the priority score computing engine 640, the priority list generator 650, and the notification creator 660 are implemented as an executable program maintained in a tangible, non-transitory memory, such as instruction memory 207 of FIG. 2, which may be executed by one or processors, such as the processor 201 of FIG. 2.

In some embodiments, the prioritization request analyzer 610 is configured to analyze a prioritization request. The prioritization request is seeking an ordered list for unloading all trailers waiting to be unloaded at a distribution center. The prioritization request may be generated by the trailer unload prioritization engine 600 itself or received from a yard management system, e.g. the trailer unload prioritization engine 102. In some embodiments, the prioritization request may be pre-scheduled based on a job-scheduler, e.g. auto-generated every 15 minutes, every half-hour, or every hour. In some embodiments, the prioritization request may be generated in response to an event or a user input, e.g. via an unload prioritization application programming interface (API) on the trailer unload prioritization engine 102 or the trailer unload prioritization engine 102.

Based on the analyzed request, the trailer information collector 620 may be configured to collect information for all trailers that have entered the gate of the distribution center and have drop delivery (i.e. non-empty trailers). In some embodiments, the trailer information collector 620 may collect the trailer information from the database 116 or from the trailer unload prioritization engine 102.

Based on the collected information, the model and parameter determiner 630 may determine a ranking model and one or more lever parameters for trailer unload prioritization. The lever parameters may include one or more of the parameters as shown in FIG. 5. In some embodiments, a trailer may not be qualified for all available lever parameters. The model and parameter determiner 630 may determine the qualified lever parameters for each trailer. The ranking model may be pre-configured model or a pre-trained machine learning model stored in the database 116.

For each and every trailer waiting to be unloaded in a yard, the priority score computing engine 640 may be configured to compute a priority score based on the lever parameters and the ranking model. In some embodiments, the ranking model may indicate different weights for different lever parameters, and indicate a manner to combine the lever parameters with the different weights.

The priority list generator 650 in this example may generate a priority list of the trailers waiting to be unloaded in the yard, based on their respective priority scores. For example, the priority list may be an ordered list ordering the trailers by ordering their respective priority scores from high to low. In some embodiments, the priority list generator 650 may store the priority list of trailers, together with their respective priority scores, into a database, e.g. the database 116.

Based on the priority list, the notification creator 660 may create one or more notifications. For example, while there are N trailers in the priority list, the trailer unload prioritization engine 600 may determine that there are K loading docks becoming available in the yard, e.g. based on data received from the trailer unload prioritization engine 102. K may be less than or equal to N. In this case, the notification creator 660 may create K notifications corresponding respectively to K trailers ranked at the top of the priority list, and transmit the K notifications respectively to K mobile devices for unloading the freights of the K trailers at the distribution center. In some examples, each of the K mobile devices may be a portable device of a driver, who will be responsible to drive a corresponding one of the K trailers to a target door of the distribution center for unloading. In some examples, each of the K mobile devices may be a yard vehicle which will automatically navigate to a corresponding one of the K trailers to facilitate mechanical coupling of the yard vehicle and the corresponding trailer, and transport the corresponding trailer to a target door of the distribution center for unloading.

In some embodiments, the notifications may be generated and transmitted by the trailer unload prioritization engine 102, based on the priority list generated by the trailer unload prioritization engine 600. In some embodiments, the trailer unload prioritization engine 600 may also publish data related to the unload prioritization and/or generate reports of trailer unloading.

Figure 7:
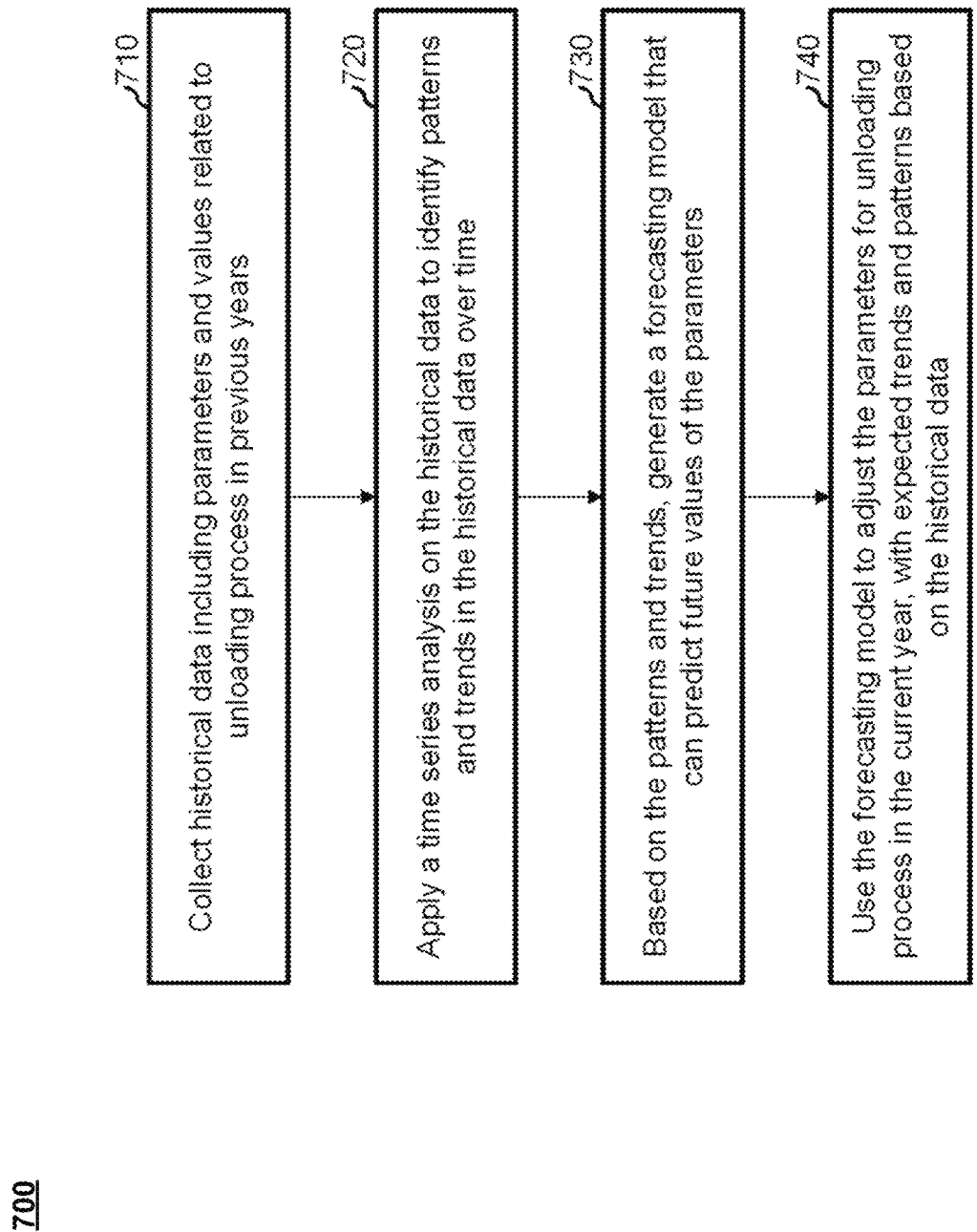
FIG. 7 illustrates an exemplary process for adjusting parameters for an unloading process, in accordance with some embodiments of the present teaching.

FIG. 7 illustrates an exemplary process 700 for adjusting parameters for an unloading process, in accordance with some embodiments of the present teaching. In the example shown in FIG. 7, the process 700 starts with operation 710, where historical data are collected. The historical data includes parameters and values (including information about holiday, month, weather, etc.) related to unloading process in previous years. At operation 720, a time series analysis is applied on the historical data to identify patterns and trends in the historical data over time, such as seasonality or underlying trends over time. Based on the patterns and trends, a forecasting model is generated at operation 730. The forecasting model may be a machine learning model that can predict future values of the parameters. At operation 740, the forecasting model is used to adjust the parameters for unloading process in the current year, with expected trends and patterns based on the historical data. In some embodiments, the parameters may be adjusted based on configured business rules that may be updated over time as well.

Figure 8:
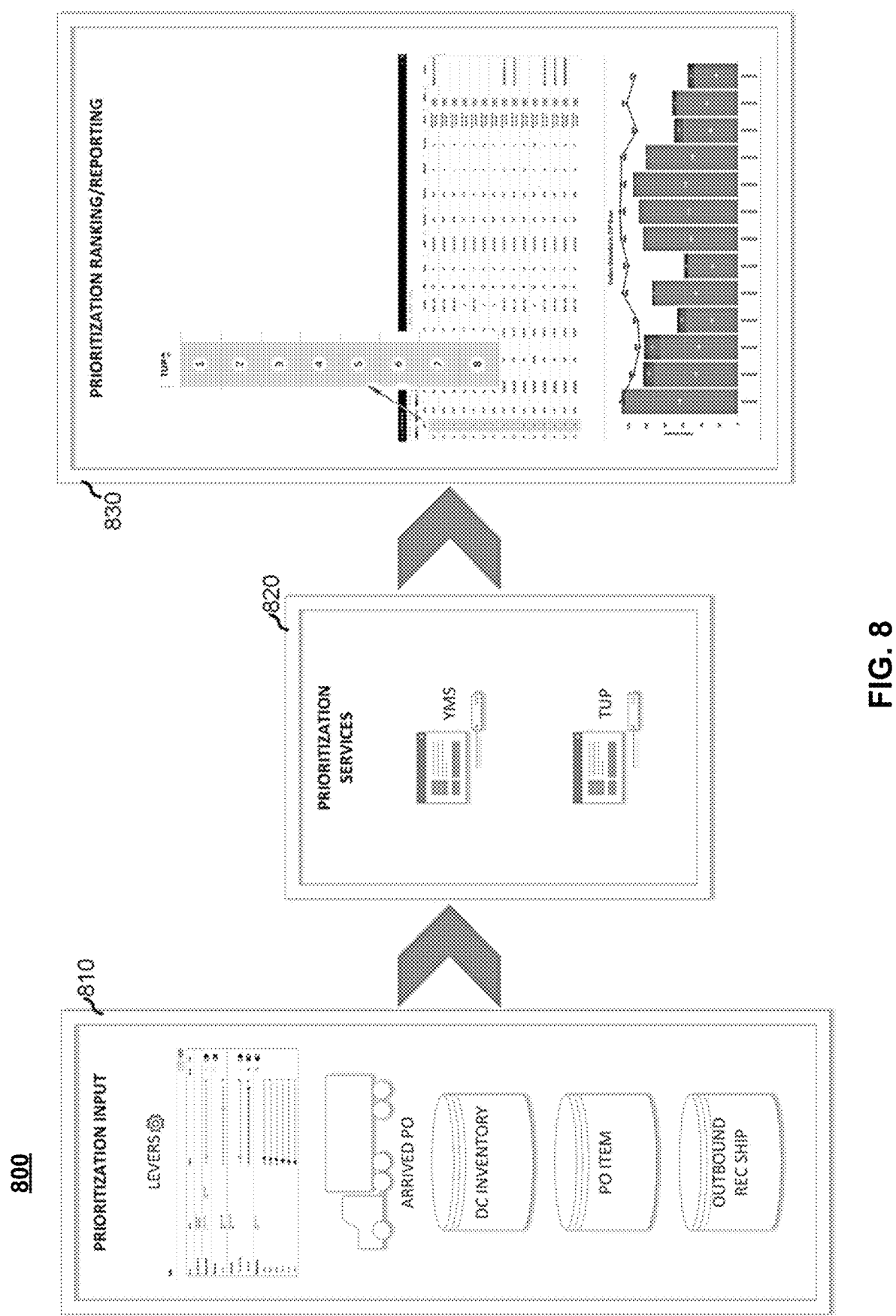
FIG. 8 shows an exemplary system for trailer unload prioritization, in accordance with some embodiments of the present teaching.

FIG. 8 shows an exemplary system 800 for trailer unload prioritization, in accordance with some embodiments of the present teaching. As shown in FIG. 8, the system 800 includes prioritization services 820, which may be provided by a yard management system (YMS) and a trailer unload prioritization (TUP) system. In some embodiments, the YMS and TUP systems may be implemented on one or more cloud servers, and may be accessed by a computer run by a manager at a distribution center or fulfillment center.

In some embodiments, the prioritization services 820 receive prioritization input 810, which may include: configured lever parameters, arrived purchase orders carried by trailers, inventory data, item data, outbound data, etc. At least some of the prioritization input 810 may be stored in one or more databases, e.g. the database 116. In some embodiments, the prioritization services 820 may be used to generate prioritization ranking 830 for trailers in the yard based on the prioritization input 810.

Figure 10:
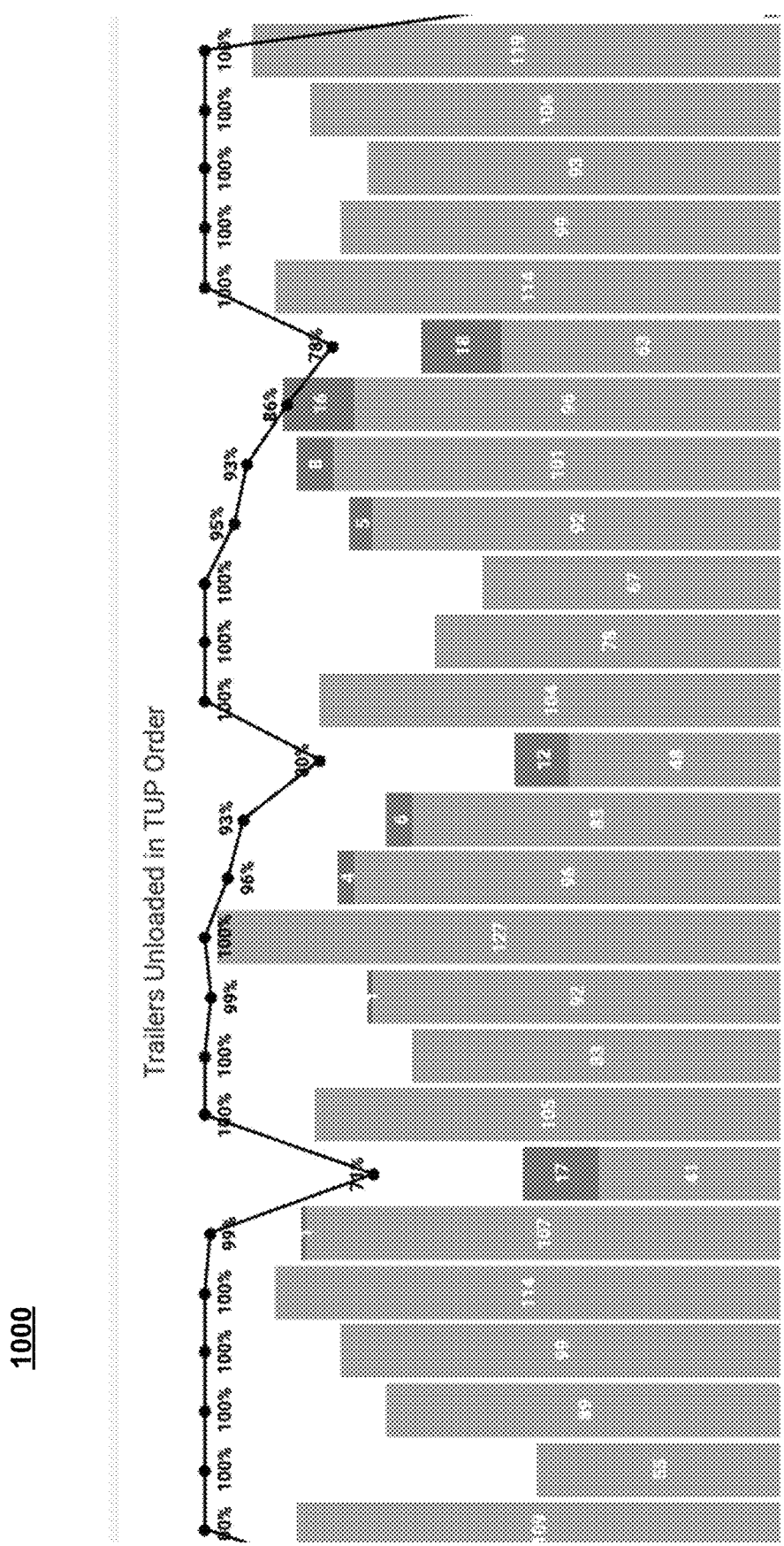
FIG. 10 shows an exemplary level of service report for trailer unload prioritization, in accordance with some embodiments of the present teaching.

In addition, the prioritization services 820 may generate reports of TUP. FIG. 10 shows an exemplary level of service (LOS) report 1000 for trailer unload prioritization, in accordance with some embodiments of the present teaching. The LOS report 1000 indicates percentages of trailers unloaded according to the TUP order over time. In some embodiments, after a distribution center manager obtains a priority list from the prioritization services 820, the distribution center manager may follow the priority list for one or more or all of the trailers waiting to be unloaded. A higher percentage of trailers unloaded according to the TUP order can indicate a better performance of the TUP or prioritization service.

In some embodiments, a TUP system can collect the LOS report 1000 as feedback data, and adjust the weights and/or the lever parameters based on the feedback data by re-training a machine learning model, or by modifying hyper-parameters of the machine learning model. In some examples, an objective function may be used by the TUP system to maximize the LOS or the percentages of trailers unloaded according to the TUP order. In some examples, an objective function may be used by the TUP system to maximize cost saving and/or user satisfaction level.

Figure 9:
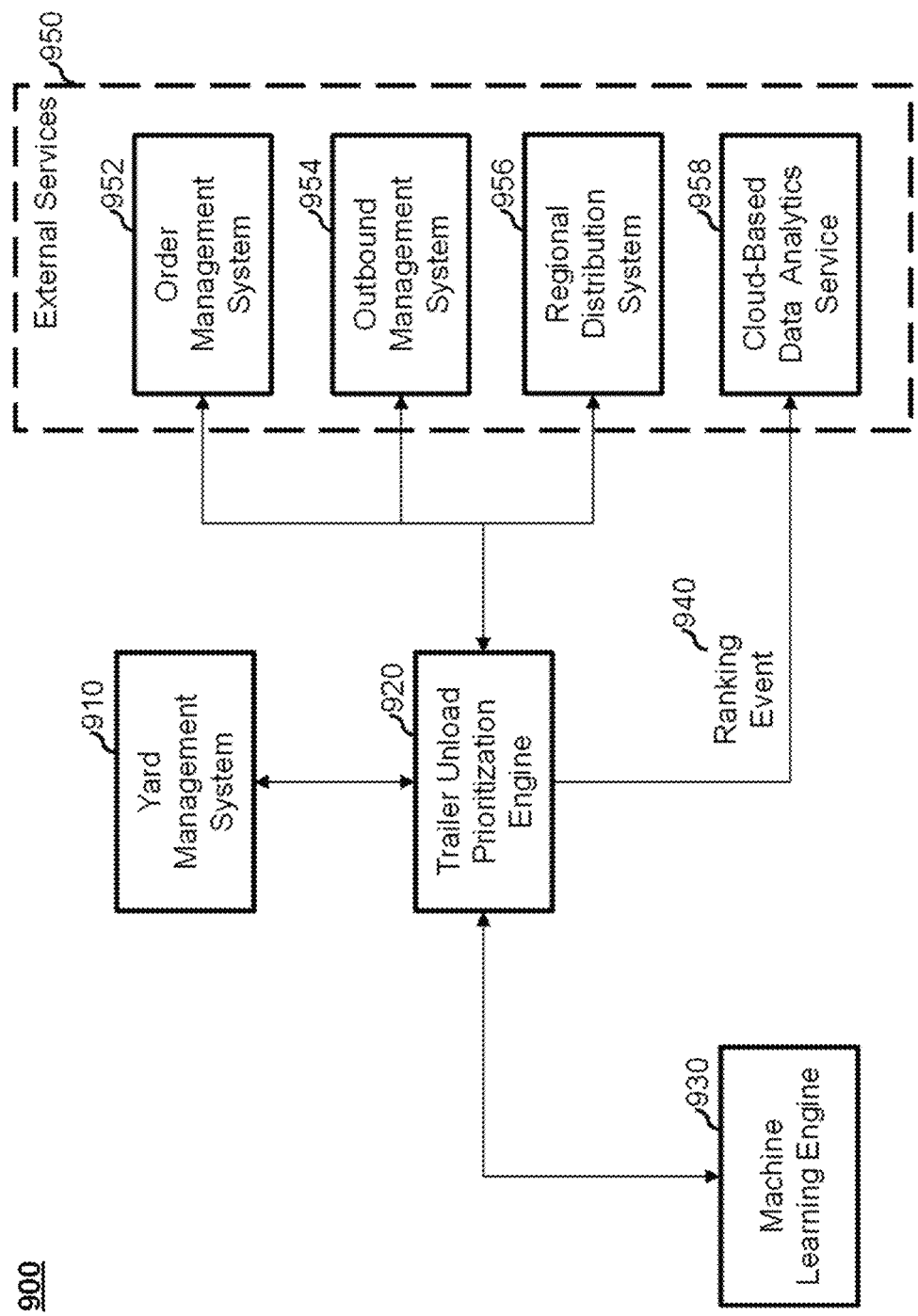
FIG. 9 illustrates an exemplary block diagram of an architecture for implementing trailer unload prioritization, in accordance with some embodiments of the present teaching.

FIG. 9 illustrates an exemplary block diagram of an architecture 900 for implementing trailer unload prioritization, in accordance with some embodiments of the present teaching. As shown in FIG. 9, the architecture 900 includes a yard management system 910, a trailer unload prioritization engine 920, a machine learning engine 930, a ranking event data collector 940, and external services 950.

In some embodiments, the trailer unload prioritization engine 920 may be configured by a scheduled job, which can trigger TUP ranking at the trailer unload prioritization engine 920 periodically. The scheduled job may be pre-configured by a distribution center manager, to perform every 10 minutes, every 15 minutes, every half-hour, every hour, etc. In some embodiments, the yard management system 910 may also trigger the TUP ranking at the trailer unload prioritization engine 920 for a distribution center, e.g. based on an unexpected event, or an instruction from a user. In some embodiments, each of the yard management system 910 and the trailer unload prioritization engine 920 is implemented as a cloud server, and can be accessed by a distribution center manager via a computer or any other computing device located at the distribution center.

The yard management system 910 and the trailer unload prioritization engine 920 may serve multiple distribution centers and multiple yards at the same time. For example, a manager of a distribution center may access the yard management system 910 to monitor the status of trailers on a yard; and there are N trailers carrying freights and waiting at the yard, with N being a positive integer larger than one. In some embodiments, the yard management system 910 and the trailer unload prioritization engine 920 may be in communication with a database and a plurality of mobile devices configured to receive notifications for unloading the freights of the N trailers at the distribution center. The database may be a cloud database or a local database at the distribution center, and may comprise information related to the N trailers.

In some embodiments, the trailer unload prioritization engine 920 may obtain, for each of the N trailers, a plurality of lever parameters, and obtain a ranking model associated with the plurality of lever parameters, e.g. via the yard management system 910 and/or from a database. In some embodiments, the plurality of lever parameters are generated based on at least some of: item-on-hand data indicating a quantity of an item carried by a trailer and currently in stock for distribution at the distribution center, where the item-on-hand data is a measure of inventory to reflect an actual amount of goods present in the warehouse or distribution center at a given time; outbound need data indicating an outbound need for goods in the freight of a trailer in one or more future time periods, where the outbound need data can vary depending on several factors such as customer demand, seasonality and production schedules; must-arrive-by-date (MABD) data indicating a quantity of days past a predetermined time by which a shipment of goods via a trailer must arrive at the distribution center; time-on-yard data indicating a time period spent by a trailer in the yard before being unloaded; first event data indicating a periodic event associated with a purchase order and a trailer; second event data indicating a non-periodic event associated with a purchase order and a trailer; carrier data indicating a carrier responsible for delivering goods via a trailer to the distribution center; trailer status data indicating a current status of each trailer; and origin data indicating an origin type of goods carried by a trailer based on their origin. For example, a trailer associated with a carrier charging more than other carriers, may be ranked higher to be unloaded earlier than other trailers.

In some embodiments, the trailer unload prioritization engine 920 may obtain one or more of the plurality of lever parameters from some of the external services 950, which may comprise an order management system 952, an outbound shipping service 954, and a regional distribution system 956. For example, the trailer unload prioritization engine 920 may receive the carrier data and the origin data from the order management system 952; receive the outbound need data from the outbound management system 954; receive the item-on-hand data from an inventory system; receive the MABD data, the trailer status data and the time-on-yard data from an inbound management system; and receive the first event data and the second event data from a replenishment system. In some embodiments, the inventory system, the inbound management system and the replenishment system may be standalone systems or part of the regional distribution system 956. In some embodiments, the trailer unload prioritization engine 920 may also capture order management data during gate-in of a trailer or any other valid scenario, from the order management system 952. In some embodiments, the outbound shipping service 954 may include outbound recommended shipping data.

In some embodiments, the trailer unload prioritization engine 920 may utilize the machine learning engine 930 to train a machine learning model as the ranking model, based on historical data, including e.g. historical trailer unloading data and historical yard management data. In some embodiments, the ranking model includes a plurality of weights each associated with one of the plurality of lever parameters. The ranking model may be re-trained by the machine learning engine 930 to adjust the plurality of weights associated with the plurality of lever parameters, periodically or upon an upcoming event.

The trailer unload prioritization engine 920 may generate a priority list of the N trailers based on the plurality of lever parameters and the ranking model. In some embodiments, the priority list is generated based on a weighted combination of the plurality of lever parameters with the plurality of weights, e.g. weighted summation of the lever parameters qualified for each trailer.

The trailer unload prioritization engine 920 can create, based at least on the priority list, K notifications corresponding respectively to K trailers ranked at the top of the priority list, with K being a positive integer not larger than N; and transmit the K notifications respectively to K mobile devices of the plurality of mobile devices, for unloading the freights of the K trailers at the distribution center.

In some embodiments, each of the K mobile devices is a portable device (e.g. a smartphone or a tablet) of a driver. After receiving a corresponding one of the K notifications, the portable device indicates that the driver is responsible to drive a corresponding one of the K trailers to a target door of the distribution center for unloading the corresponding trailer. The driver may pick the trailer and drive the trailer to the target door; or pick another vehicle (different from the one delivering the trailer) to drive the trailer to the target door. The portable device may help reporting real time status of the trailer to the yard management system 910 and/or the trailer unload prioritization engine 920, e.g. whether the trailer is moving, where is the trailer, whether the trailer has been moved to the target door, etc.

In some embodiments, each of the K mobile devices is a yard vehicle. After receiving a corresponding one of the K notifications, the yard vehicle can automatically navigate to a corresponding one of the K trailers to facilitate mechanical coupling of the yard vehicle and the corresponding trailer, and transport the corresponding trailer to a target door of the distribution center for unloading the corresponding trailer.

The trailer unload prioritization engine 920 may periodically obtain, by itself or through the yard management system 910, unloading status of all trailers at the yard of the distribution center for each time period, e.g. every 15 minutes, every hour, etc. The trailer unload prioritization engine 920 can update the priority list based on the periodically obtained unloading status for each time period; and determine, from the periodically obtained unloading status for each time period, an unloading order list of trailers being unloaded. Based on a comparison between the priority list and the unloading order list in each time period, the trailer unload prioritization engine 920 may generate a report indicating a performance of the trailer unload prioritization service of the trailer unload prioritization engine 920. For example, the report may indicate a percentage of trailers unloaded according to the priority list generated by the trailer unload prioritization engine 920. In some embodiments, the trailer unload prioritization engine 920 may provide ranking event data 940 to query a cloud-based data analytics service 958 for generating the report.

Various embodiments have disclosed a TUP system that can calculate real time ranking of trailers with multiple unique lever parameters; and perform a forecasting to adjust the parameters based on historical data. The TUP system can connect with supply chain systems such as inventory, replenishment, order management system, scheduler, yard management system, item inventory, etc.; and calculate real-time trailer unloading priority by comparing trailers across a yard of a distribution center or fulfilment center. The TUP system can generate a snapshot of trailers ranking, to help unloading prioritization and analyze level of service for the trailers in real-time. In addition, the TUP system can automatically adjust the weights of the lever parameters using historical data, e.g. based on machine learning time series forecasting to automatically adjust the configured weights of lever parameters for every holiday, every month, or every shopping season, e.g. Christmas, Thanksgiving. Some evaluations of the disclosed TUP system have shown that the TUP system can save business cost for distribution centers and fulfillment centers, increase level of service for trailer unloading, reduce receipt timing misses, and increase outbound service level.

Figure 11:
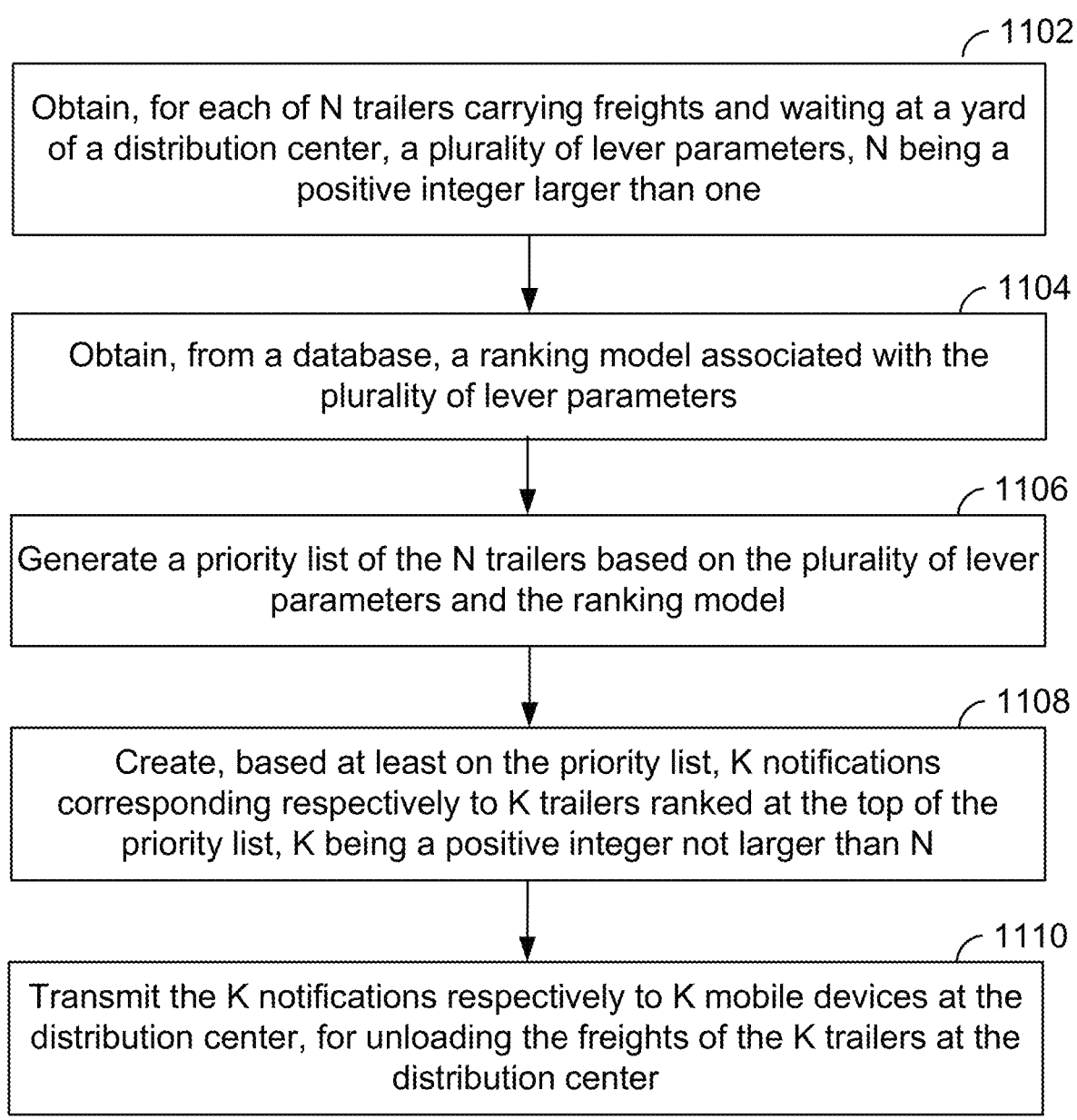
FIG. 11 is a flowchart illustrating an exemplary method for trailer unload prioritization, in accordance with some embodiments of the present teaching.

FIG. 11 is a flowchart illustrating an exemplary method 1100 for trailer unload prioritization, in accordance with some embodiments of the present teaching. In some embodiments, the method 1100 can be carried out by one or more systems or devices, such as the yard management system 101 and/or the trailer unload prioritization engine 102 of FIG. 1. Beginning at operation 1102, a plurality of lever parameters is obtained for each of N trailers carrying freights and waiting at a yard of a distribution center. N is a positive integer larger than one. At operation 1104, a ranking model associated with the plurality of lever parameters is obtained from a database. At operation 1106, a priority list of the N trailers is generated based on the plurality of lever parameters and the ranking model. At operation 1108, based at least on the priority list, K notifications are created corresponding respectively to K trailers ranked at the top of the priority list. K is a positive integer not larger than N. At operation 1110, the K notifications are transmitted respectively to K mobile devices at the distribution center, for unloading the freights of the K trailers at the distribution center.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:
   at least one mobile device associated with a product receiving center at which a plurality of trailers carrying freight are waiting to be unloaded; and
   a computing device comprising at least one processor that is in communication with the at least one mobile device and configured to:
   obtain, for each of the plurality of trailers, a plurality of lever parameters,
   train a ranking model including a plurality of parameter weights based on historical trailer unloading data and historical yard management data, wherein each of the plurality of parameter weights is associated with a corresponding one of the plurality of lever parameters,
   execute the ranking model on the plurality of lever parameters to generate a priority list of the plurality of trailers based on a weighted combination of the plurality of lever parameters with the plurality of parameter weights,
   create, based at least on the priority list, a control signal corresponding to a top trailer ranked at the top of the priority list,
   transmit the control signal to the at least one mobile device, the control signal including an instruction to transport the top trailer to a target door of the product receiving center for unloading the freight of the top trailer, and
   re-train the ranking model to adjust the plurality of parameter weights periodically or upon an upcoming event.

2. The system of claim 1, wherein the plurality of lever parameters is generated based on at least one of the following:
   item-on-hand data indicating a quantity of an item carried by a trailer and currently in stock for distribution at the product receiving center;
   outbound need data indicating an outbound need for goods in the freight of a trailer in one or more future time periods;
   must-arrive-by-date (MABD) data indicating a quantity of days past a predetermined time by which a shipment of goods via a trailer must arrive at the product receiving center;
   time-on-yard data indicating a time period spent by a trailer in a yard of the product receiving center before being unloaded;

first event data indicating a periodic event associated with a purchase order and a trailer;

second event data indicating a non-periodic event associated with a purchase order and a trailer;

carrier data indicating a carrier responsible for delivering goods via a trailer to the product receiving center;

trailer status data indicating a current status of each trailer; and origin data indicating an origin type of goods carried by a trailer based on their origin.

3. The system of claim 2, wherein the computing device is configured to:

receive the item-on-hand data from an inventory system;

receive the MABD data, the trailer status data and the time-on-yard data from an inbound management system;

receive the first event data and the second event data from a replenishment system;

receive the outbound need data from an outbound management system; and receive the carrier data and the origin data from an order management system.

4. The system of claim 1, wherein the computing device is configured to:

periodically obtain unloading status of all trailers at a yard of the product receiving center for each time period;

update the priority list based on the periodically obtained unloading status for each time period;

determine, from the periodically obtained unloading status for each time period, an unloading order list of trailers being unloaded; and generate a report based on a comparison between the priority list and the unloading order list in each time period.

5. The system of claim 1, wherein:

the at least one mobile device is a portable device of a driver; and after receiving the control signal, the portable device indicates that the driver is responsible to drive the top trailer to a target door of the product receiving center for unloading.

6. The system of claim 1, wherein:

the at least one mobile device is a yard vehicle; and after receiving the control signal, the yard vehicle automatically navigates to the top trailer to facilitate mechanical coupling of the yard vehicle and the top trailer, and transports the top trailer to a target door of the product receiving center for unloading.

7. A method implemented on a computing device having at least one processor, comprising:

obtaining, for each of a plurality of trailers carrying freights and waiting at a product receiving center, a plurality of lever parameters;

training a ranking model including a plurality of parameter weights based on historical trailer unloading data and historical yard management data, wherein each of the plurality of parameter weights is associated with a corresponding one of the plurality of lever parameters;

executing the ranking model on the plurality of lever parameters to generate a priority list of the plurality of trailers based on a weighted combination of the plurality of lever parameters with the plurality of parameter weights;

creating, based at least on the priority list, a control signal corresponding to a top trailer ranked at the top of the priority list;

transmitting the control signal to at least one mobile device, the control signal including an instruction to transport the top trailer to a target door of the product receiving center for unloading the freight of the top trailer; and re-training the ranking model to adjust the plurality of parameter weights periodically or upon an upcoming event.

8. The method of claim 7, wherein the plurality of lever parameters is generated based on at least one of the following:

item-on-hand data indicating a quantity of an item carried by a trailer and currently in stock for distribution at the product receiving center;

outbound need data indicating an outbound need for goods in the freight of a trailer in one or more future time periods;

must-arrive-by-date (MABD) data indicating a quantity of days past a predetermined time by which a shipment of goods via a trailer must arrive at the product receiving center;

time-on-yard data indicating a time period spent by a trailer in a yard before being unloaded;

first event data indicating a periodic event associated with a purchase order and a trailer;

second event data indicating a non-periodic event associated with a purchase order and a trailer;

carrier data indicating a carrier responsible for delivering goods via a trailer to the product receiving center;

trailer status data indicating a current status of each trailer; and origin data indicating an origin type of goods carried by a trailer based on their origin.

9. The method of claim 8, further comprising:

receiving the item-on-hand data from an inventory system;

receiving the MABD data, the trailer status data and the time-on-yard data from an inbound management system;

receiving the first event data and the second event data from a replenishment system;

receiving the outbound need data from an outbound management system; and receiving the carrier data and the origin data from an order management system.

10. The method of claim 7, further comprising:

periodically obtaining unloading status of all trailers at a yard of the product receiving center for each time period;

updating the priority list based on the periodically obtained unloading status for each time period;

determining, from the periodically obtained unloading status for each time period, an unloading order list of trailers being unloaded; and generating a report based on a comparison between the priority list and the unloading order list in each time period.

11. The method of claim 7, wherein:

the at least one mobile device is a portable device of a driver; and after receiving the control signal, the portable device indicates that the driver is responsible to drive the top trailer to a target door of the product receiving center for unloading.

12. The method of claim 7, wherein:

the at least one mobile device is a yard vehicle; and after receiving the control signal, the yard vehicle automatically navigates to the top trailer to facilitate mechanical coupling of the yard vehicle and the top trailer, and transports the top trailer to a target door of the product receiving center for unloading.

13. A non-transitory computer readable medium having instructions stored thereon, wherein the instructions, when executed by at least one processor, cause at least one device to perform operations comprising:

obtaining, for each of a plurality of trailers carrying freights and waiting at a product receiving center, a plurality of lever parameters;

training a ranking model including a plurality of parameter weights based on historical trailer unloading data and historical yard management data, wherein each of the plurality of parameter weights is associated with a corresponding one of the plurality of lever parameters;

executing the ranking model on the plurality of lever parameters to generate a priority list of the plurality of trailers based on a weighted combination of the plurality of lever parameters with the plurality of parameter weights;

creating, based at least on the priority list, a control signal corresponding to a top trailer ranked at the top of the priority list;

transmitting the control signal to at least one mobile device, the control signal including an instruction to transport the top trailer to a target door of the product receiving center for unloading the freight of the top trailer; and re-training the ranking model to adjust the plurality of parameter weights periodically or upon an upcoming event.

14. The non-transitory computer readable medium of claim 13, wherein the plurality of lever parameters are generated based on at least one of the following:

item-on-hand data indicating a quantity of an item carried by a trailer and currently in stock for distribution at the product receiving center;

outbound need data indicating an outbound need for goods in the freight of a trailer in one or more future time periods;

must-arrive-by-date (MABD) data indicating a quantity of days past a predetermined time by which a shipment of goods via a trailer must arrive at the product receiving center;

time-on-yard data indicating a time period spent by a trailer in a yard of the product receiving center before being unloaded;

first event data indicating a periodic event associated with a purchase order and a trailer;

second event data indicating a non-periodic event associated with a purchase order and a trailer;

carrier data indicating a carrier responsible for delivering goods via a trailer to the product receiving center;

trailer status data indicating a current status of each trailer; and origin data indicating an origin type of goods carried by a trailer based on their origin.

15. The non-transitory computer readable medium of claim 13, wherein the instructions, when executed by the at least one processor, further cause the at least one device to perform operations comprising:

periodically obtaining unloading status of all trailers at a yard of the product receiving center for each time period;

updating the priority list based on the periodically obtained unloading status for each time period;

determining, from the periodically obtained unloading status for each time period, an unloading order list of trailers being unloaded; and generating a report based on a comparison between the priority list and the unloading order list in each time period.

* * * * *